US011645870B2

(12) United States Patent
Eom

(10) Patent No.: US 11,645,870 B2
(45) Date of Patent: May 9, 2023

(54) APPARATUS AND METHOD FOR RECOGNIZING A FACE

(71) Applicants: Hyundai Motor Company, Seoul (KR); Kia Motors Corporation, Seoul (KR)

(72) Inventor: Ki Tae Eom, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 157 days.

(21) Appl. No.: 16/937,953

(22) Filed: Jul. 24, 2020

(65) Prior Publication Data

US 2021/0124910 A1    Apr. 29, 2021

(30) Foreign Application Priority Data

Oct. 29, 2019 (KR) .......................... 10-2019-0135560

(51) Int. Cl.
*G06V 40/16* (2022.01)
*B60N 2/00* (2006.01)
*B60R 25/25* (2013.01)
*G06T 7/73* (2017.01)

(52) U.S. Cl.
CPC .......... *G06V 40/171* (2022.01); *B60N 2/002* (2013.01); *B60R 25/25* (2013.01); *G06T 7/73* (2017.01)

(58) Field of Classification Search
CPC .... G06V 40/171; G06V 20/59; G06V 40/172; G06V 40/166; G06V 40/168; G06V 20/597; B60N 2/002; B60R 25/25; G06T 7/73; G06N 3/0454; H04W 4/021
See application file for complete search history.

(56) References Cited

U.S. PATENT DOCUMENTS

| | | | |
|---|---|---|---|
| 9,180,887 B2 * | 11/2015 | Nemat-Nasser | G06V 20/597 |
| 2001/0019620 A1 * | 9/2001 | Nagai | G06V 40/161 |
| | | | 382/104 |
| 2006/0261931 A1 * | 11/2006 | Cheng | G06V 40/45 |
| | | | 340/5.53 |
| 2012/0327232 A1 * | 12/2012 | Yang | B60R 16/0373 |
| | | | 348/148 |
| 2017/0238860 A1 * | 8/2017 | el Kaliouby | A61B 5/7267 |
| 2018/0068510 A1 * | 3/2018 | Atsumi | G07C 9/00309 |
| 2018/0075565 A1 * | 3/2018 | Myers | G05D 1/0088 |
| 2018/0176837 A1 * | 6/2018 | Xiao | H04W 36/0088 |
| 2018/0257658 A1 * | 9/2018 | Cho | B60W 40/08 |
| 2019/0176837 A1 * | 6/2019 | Williams | B60W 40/08 |
| 2019/0318159 A1 * | 10/2019 | Blanc-Paques | G06Q 50/30 |
| 2020/0082157 A1 * | 3/2020 | Susskind | G06V 40/171 |
| 2020/0134672 A1 * | 4/2020 | el Kaliouby | G06V 40/162 |
| 2020/0250407 A1 * | 8/2020 | Kaneichi | G06V 40/70 |
| 2021/0291790 A1 * | 9/2021 | Morosawa | B60R 25/31 |
| 2022/0019646 A1 * | 1/2022 | Bielby | B60R 25/257 |
| 2022/0114362 A1 * | 4/2022 | Kim | B60W 50/0098 |

* cited by examiner

*Primary Examiner* — Wesley J Tucker
(74) *Attorney, Agent, or Firm* — Slater Matsil, LLP

(57) ABSTRACT

An apparatus for recognizing a face is provided. The apparatus includes a camera configured to obtain a partial-face image of a passenger, and a controller configured to learn a boarding condition of a user and recognize the user based on the partial-face image of the passenger when a current boarding condition of the passenger satisfies the learned boarding condition.

16 Claims, 10 Drawing Sheets

APPARATUS AND METHOD FOR RECOGNIZING A FACE

CROSS-REFERENCE TO RELATED APPLICATIONS

This application claims priority to Korean Patent Application No. 10-2019-0135560, filed in the Korean Intellectual Property Office on Oct. 29, 2019, which application is hereby incorporated herein by reference.

TECHNICAL FIELD

The present disclosure relates to an apparatus and a method for recognizing a face.

BACKGROUND

Recently, a technology has been developed for determining whether a passenger that boarded a vehicle is a specific user through recognition of the face of the user, and for setting in-vehicle functions suitable for the user to increase convenience of the user who boarded the vehicle. In general, feature points are extracted from a full-face image of the passenger, and whether the face is recognized is determined based on whether the extracted feature points match previously stored feature points of the user by the predetermined number. However, when the full-face image of the passenger is not obtained because a portion of the face of the passenger is covered, it is difficult to extract the feature points, and thus, the passenger is not recognized as the user even though the user boarded.

SUMMARY

Embodiments of the present disclosure can solve the above-mentioned problems occurring in the prior art while advantages achieved by the prior art are maintained intact.

An embodiment of the present disclosure provides an apparatus and a method for recognizing a face that may recognize a user accurately even when a portion of a face of a passenger boarding a vehicle is covered.

The technical problems to be solved by embodiments of the present inventive concept are not limited to the aforementioned problems, and any other technical problems not mentioned herein will be clearly understood from the following description by those skilled in the art to which the present disclosure pertains.

According to an embodiment of the present disclosure, an apparatus for recognizing a face includes a camera for obtaining a partial-face image of a passenger and a controller that learns a boarding condition of a user and recognizes the face based on the partial-face image of the passenger when a current boarding condition of the passenger satisfies the learned boarding condition.

In one embodiment, the boarding condition may include information on a boarding location and a boarding time.

In one embodiment, the controller may obtain a boarding condition and a first full-face image of a first passenger, extract feature points from the first full-face image and register the first passenger as the user, register the boarding condition of the first passenger as the boarding condition of the user, and store the number of times the user has boarded under the boarding condition of the user as "one time".

In one embodiment, the controller may, when learning the boarding condition of the user, obtain a boarding condition and a second full-face image of a second passenger, and extract feature points from the second full-face image to determine whether the second passenger is the registered user.

In one embodiment, the controller may determine whether a boarding condition for learning satisfies the boarding condition of the user when the second passenger is the registered user.

In one embodiment, the controller may determine that the boarding condition for learning satisfies the boarding condition of the user when a boarding location for learning is within a predetermined distance from a boarding location of the user, or when a boarding time for learning is within a predetermined time from a boarding time of the user.

In one embodiment, the controller may add one to the number of times the user has boarded under the boarding condition of the user when the boarding condition for learning satisfies the boarding condition of the user.

In one embodiment, the controller may determine that the learning of the boarding condition of the user is completed when the number of times the user has boarded under the boarding condition of the user exceeds a predetermined number.

In one embodiment, the controller may register the boarding condition for learning as a new boarding condition of the user when the boarding condition for learning does not satisfy the boarding condition of the user, and store the number of times the user has boarded under the boarding condition of the user as "one time".

In one embodiment, the controller may reduce the number of feature points for recognizing the face when the current boarding condition of the passenger satisfies the learned boarding condition of the user.

In one embodiment, the controller may determine the passenger as the user when the feature points extracted from the partial-face image of the passenger match the feature points extracted during the user registration.

According to another embodiment of the present disclosure, a method for recognizing a face includes learning a boarding condition of a user, obtaining a partial-face image of a passenger, and recognizing the face based on the partial-face image of the passenger when a current boarding condition of the passenger satisfies the learned boarding condition.

In one embodiment, the boarding condition may include information on a boarding location and a boarding time.

In one embodiment, the method may further include, before the learning of the boarding condition of the user, obtaining a boarding condition and a first full-face image of a first passenger, extracting a plurality of first feature points from the first full-face image and registering the first passenger as the user, and registering the boarding condition of the first passenger as the boarding condition of the user and storing the number of times the user has boarded under the boarding condition of the user as "one time".

In one embodiment, the learning of the boarding condition of the user may include obtaining a boarding condition for learning and a second full-face image for learning of a second passenger, extracting feature points from the second full-face image for learning to determine whether the second passenger is the registered user, determining whether the boarding condition for learning satisfies the boarding condition of the user when the second passenger is the registered user, adding one to the number of times the user has boarded under the boarding condition of the user when the boarding condition for learning satisfies the boarding condition of the user, determining whether the number of times the user has boarded under the boarding condition of the user exceeds a predetermined number, and determining that the learning of the boarding condition of the user is completed when the number of times the user has boarded under the boarding condition of the user exceeds the predetermined number.

In one embodiment, the determining of whether the boarding condition for learning satisfies the boarding condition of the user may include determining that the boarding condition for learning satisfies the boarding condition of the user when a boarding location for learning is within a predetermined distance from a boarding location of the user, or when a boarding time for learning is within a predetermined time from a boarding time of the user.

In one embodiment, the method may further include registering the boarding condition for learning as a new boarding condition of the user when the boarding condition for learning does not satisfy the boarding condition of the user, and storing the number of times the user has boarded under the new boarding condition as "one time".

In one embodiment, the method may further include, before recognizing the face based on the partial-face image of the passenger, reducing the number of feature points for recognizing the face when the current boarding condition of the passenger satisfies the learned boarding condition of the user.

In one embodiment, recognizing the face based on the partial-face image of the passenger may include extracting feature points from the partial-face image of the passenger, determining whether the feature points extracted from the partial-face image of the passenger match feature points extracted during the user registration, and determining the passenger as the user when the feature points extracted from the partial-face image of the passenger match the feature points extracted during the user registration.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF ILLUSTRATIVE EMBODIMENTS

Figure 1:
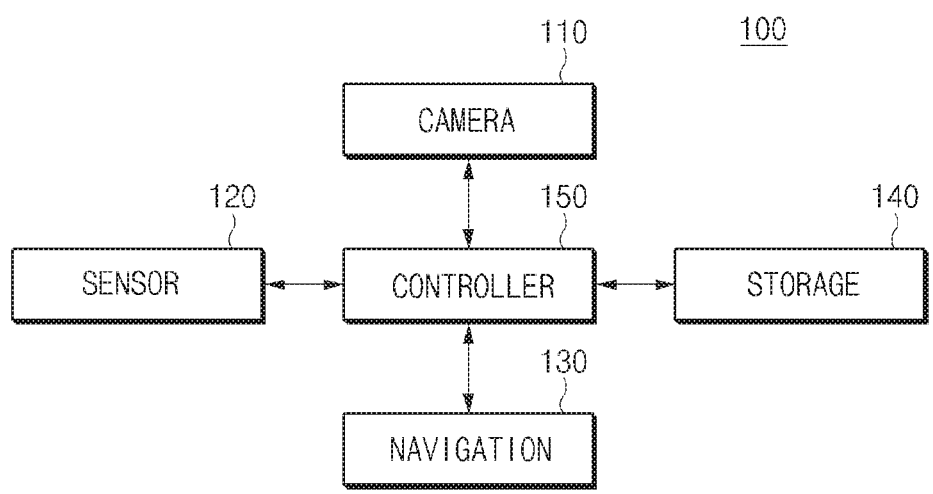
FIG. 1 is a diagram illustrating a configuration of a face recognition apparatus according to one embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiments of the present disclosure, a detailed description of well-known features or functions will be omitted in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a diagram illustrating a configuration of a face recognition apparatus according to one embodiment of the present disclosure.

As shown in FIG. 1, a face recognition apparatus 100 according to an embodiment of the present disclosure may include a camera no, a sensor 120, a navigation device 130, a storage device 140, and a controller 150.

The camera no may obtain a face image of a passenger. The camera no may be disposed around a cluster such that a capturing direction is directed to a passenger's face. The camera no may include an infrared sensor to easily obtain the face image of the passenger even inside a vehicle that is dark.

The sensor 120 may detect whether the passenger boarded. To this end, the sensor 120 may include a weight detecting sensor disposed in a seat and a sensor for detecting whether a seat belt is fastened.

The navigation device 130 may obtain a boarding condition of the passenger that boarded the vehicle. In this connection, the boarding condition may include a boarding time and a boarding location. To this end, the navigation device 130 may include a GPS receiver to receive a current location of the vehicle, and provide map image information and the like of a certain region based on the current location of the vehicle. In addition, the navigation device 130 may provide the controller 150 with time data output from the GPS receiver.

The storage device 140 may store results determined by an operation of the controller 150. For example, the storage device 140 may store user information, user boarding information, learning results of the boarding information, and the like. In addition, the storage device 140 may store at least one algorithm that performs calculation or execution of various commands as well as learning for an operation of the face recognition apparatus according to an embodiment of the present disclosure. The storage device 140 may include at least one storage medium of a flash memory, a hard disk, a memory card, a read-only memory (ROM), a random access memory (RAM), an electrically erasable programmable read-only memory (EEPROM), a programmable read-only memory (PROM), a magnetic memory, a magnetic disk, and an optical disk.

The controller 150 may be implemented by various processing devices, such as a microprocessor with a built-in semiconductor chip capable of performing the calculation or the execution of the various commands, and may control the operation of the face recognition apparatus according to an embodiment of the present disclosure. Specifically, the controller 150 may learn the boarding condition of the passenger, and may recognize the face based on a partial-face image of the passenger when a current boarding condition of the passenger satisfies a previously learned condition.

First, the controller 150 may register the passenger as the user, and may register the boarding condition of the user. To this end, the controller 150 may identify the boarding of the passenger and obtain the boarding condition. In addition, the controller 150 may obtain a full-face image of the passenger from the camera no and extract feature points from the full-face image. A detailed description will be described with reference to FIG. 2.

Figure 2:
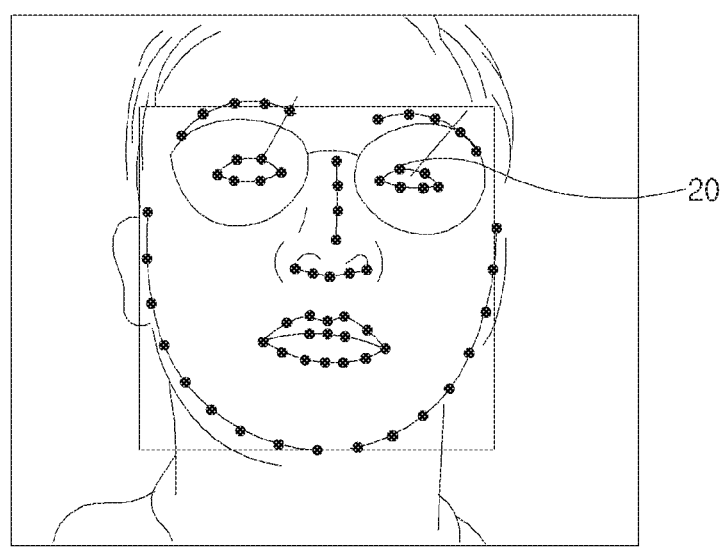
FIG. 2 is a view schematically illustrating feature points extracted from a full-face image.

FIG. 2 is a view schematically illustrating feature points extracted from a full-face image. As shown in FIG. 2, the controller 150 may extract a plurality of feature points from the full-face image. In this connection, the full-face image may include an image in which a portion of the face is not covered. For example, the full-face image may mean an image in which the portion of the face is not covered by sunglasses, a hat, or the like. In addition, the number of feature points extracted by the controller 150 may be a sufficient number to recognize the face in the full-face image. As such, the extraction by the controller 150 of the feature points from the full-face image is for recognizing the face in a normal state.

The controller 150 may extract the feature points, and recognize the face of the passenger using the extracted feature points. When the face of the passenger is recognized based on the feature points extracted from the full-face image, the controller 150 may determine that the face is recognized in the normal state, and when the face of the passenger is recognized in the normal state, the controller 150 may register the face of the passenger as the user. When the passenger is registered as the user, the controller 150 may register the boarding condition obtained when the passenger boards the vehicle as the boarding condition of the user. In addition, when the user registration and the boarding condition registration are completed, the controller 150 may control the storage device 140 to store the user registration information and the user boarding condition. In addition, when the user registration and the boarding condition registration are completed, the controller 150 may control to store the number of times the user has boarded under the boarding condition of the user as "one time".

The controller 150 learns the boarding condition of the passenger when the registration of the user and the registration of the boarding condition of the user are completed. That is, the controller 150 may continuously learn whether the passenger that boarded the vehicle is the user after the registration of the user and the registration of the boarding condition of the user.

More specifically, the controller 150 identifies the vehicle boarding of the passenger and obtains the boarding condition. In this connection, the boarding condition may include the boarding time and the boarding location of the passenger. Further, because the controller 150 obtains the boarding condition for learning, the boarding condition will be referred to as a boarding condition for learning for convenience.

When obtaining the boarding condition for learning, the controller 150 obtains the full-face image of the passenger. In addition, the controller 150 may extract feature points from the full-face image and recognize the face of the passenger based on the extracted feature points. The controller 150 determines whether the recognized face of the passenger is the previously registered user. When determining that the passenger is the previously registered user, the controller 150 determines whether the boarding condition for learning satisfies the boarding condition of the user.

In this connection, the controller 150 may determine whether boarding location and boarding time for learning are similar to the boarding location and boarding time of the user, and determine whether the boarding condition for learning satisfies the boarding condition of the user based on the determination result.

Specifically, the controller 150 may determine whether the boarding location for learning is within a predetermined distance from the boarding location of the user. In this connection, the predetermined distance may be a radius of 500 meters. In addition, when the boarding location for learning is within the predetermined distance from the boarding location of the user, the controller 150 may determine that the boarding condition for learning satisfies the boarding condition of the user.

In addition, the controller 150 may determine whether the boarding time for learning is within a predetermined time from the boarding time of the user. In this connection, the predetermined time may be 60 minutes. In addition, when the boarding time for learning is within the predetermined time from the user's boarding time, the controller 150 may determine that the boarding condition for learning satisfies the boarding condition of the user.

When it is determined that the boarding condition for learning satisfies the boarding condition of the user, the controller 150 may control to add one to the number of times the passenger boarded under the boarding condition of the user and store the added number of times. When it is determined that the boarding condition for learning does not satisfy the boarding condition of the user, the controller 150 may control to register the boarding condition for learning as a new boarding condition of the user and store the number of times the passenger boarded under the new boarding condition of the user as "one time".

The controller 150 may repeat adding one to the number of times the passenger boarded a predetermined number of times until the number of times the passenger boarded under the boarding condition of the user exceeds N times (e.g., 10 times), and determine whether the boarding condition of the passenger is the boarding condition of the user as the passenger boards the vehicle to learn the boarding condition of the user. According to an embodiment, the controller 150 may use a recurrent neural network (RNN) to learn a learning condition of the user, and in this case, an input value may include a place and a time (date (day) and time). In addition, when the number of times the user has boarded under the boarding condition of the user exceeds the predetermined number of times (e.g., 10 times), the controller 150 may determine that the boarding condition of the user is learned.

Hereinafter, an operation, by the controller 150, of recognizing the face of the passenger currently boarding the vehicle based on the boarding condition previously learned will be described.

The controller 150 identifies the vehicle boarding of the passenger and obtains the current boarding condition. In this connection, the current boarding condition may include a current boarding time and a current boarding location of the passenger.

The controller 150 determines whether the obtained current boarding condition satisfies the previously learned boarding condition. That is, the controller 150 may determine whether the current boarding location and boarding time satisfy the previously learned boarding condition of the user. In this connection, the controller 150 may determine whether the boarding location of the passenger is within the predetermined distance from the boarding location of the user, and may determine whether the boarding time of the passenger is within the predetermined time from the boarding time of the user.

When it is determined that the current boarding condition satisfies the previously learned boarding condition, the controller 150 reduces the number of feature points for recognizing the face of the passenger. Although the controller 150 extracts the plurality of feature points enough to recognize the face based on the full-face image during the user registration and the boarding condition learning, when it is determined that the current boarding condition satisfies the previously learned boarding condition, the controller 150 may reduce and reset the number of feature points.

For example, when the number of extracted feature points is 70, the controller 150 may determine that at least 70 feature points are required to recognize the face in the full-face image. On the other hand, according to an embodiment of the present disclosure, when it is determined that the current boarding condition satisfies the previously learned condition, the controller 150 may reduce and set the number of feature points for the face recognition to 35.

The controller 150 obtains the partial-face image of the passenger. In this connection, the partial-face image may refer to an image in which a portion of the face is covered so that it is not the full-face image, which will be described with reference to FIGS. 3 and 4.

Figure 3:
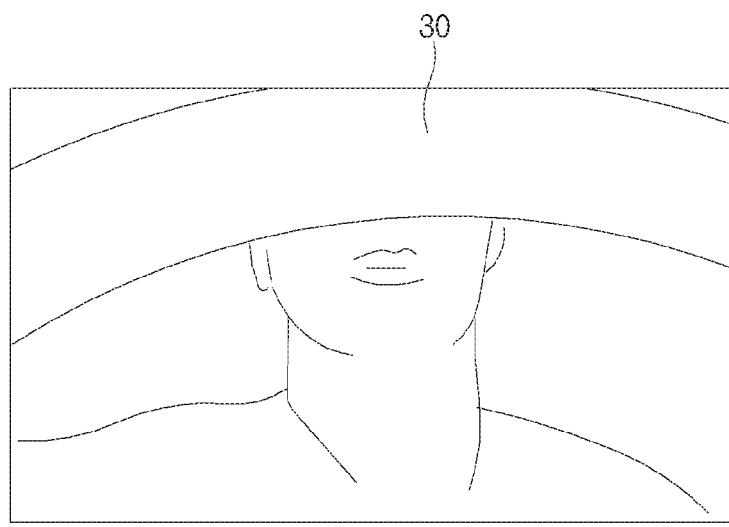
FIGS. 3 and 4 are diagrams illustrating examples in which a full-face image is not able to be obtained.
Figure 4:
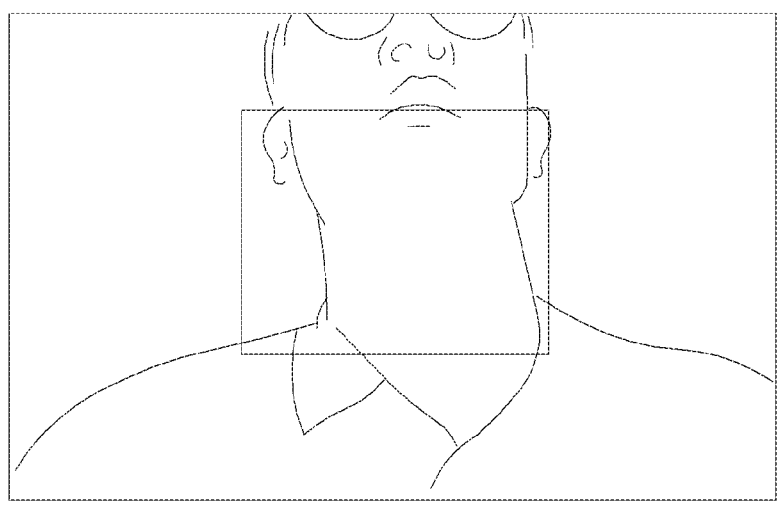

FIGS. 3 and 4 are diagrams illustrating examples in which a full-face image is not able to be obtained.

The controller 150 may obtain an image in which a portion of the face of the passenger is covered by a steering wheel 30 as shown in FIG. 3, and may obtain an image in which only a portion of the face is not included due to a seating position or a body structure of the passenger as shown in FIG. 4.

The controller 150 may extract feature points based on the image in which the portion of the face is covered. This will be described with reference to FIG. 5.

Figure 5:
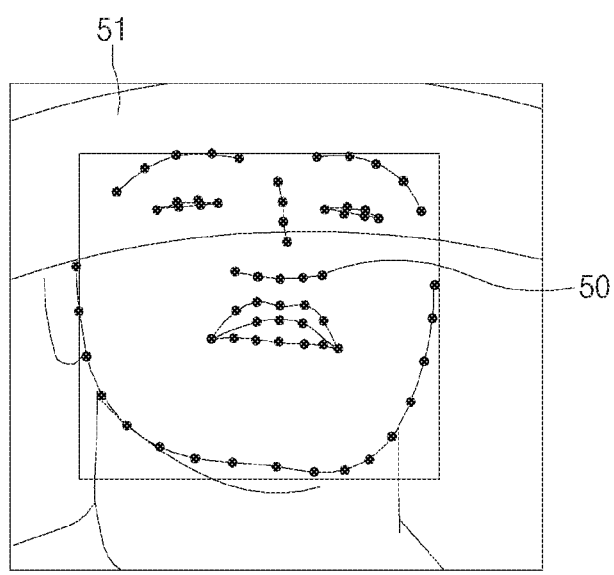
FIG. 5 is a view schematically illustrating feature points extracted according to one embodiment of the present disclosure.

FIG. 5 is a view schematically illustrating feature points extracted according to one embodiment of the present disclosure.

As shown in FIG. 5, the controller 150 may extract feature points 50 based on an image in which a portion of the face is covered (by a steering wheel 51). In this connection, since the portion of the face is covered, the number of feature points 50 that may be extracted by the controller 150 is smaller than the number of feature points ("20" of FIG. 2) that may be extracted from the full-face image.

The controller 150 may determine whether the feature points extracted from the image in which the portion of the face is covered match the feature points extracted during the user registration. In this connection, the controller 150 may determine whether the feature points extracted from the image in which the portion of the face is covered match the feature points extracted during the user registration by the reduced number of feature points. For example, when the controller 150 extracts 40 feature points from the image in which the portion of the face is covered and when the reduced number of feature points is 35, the controller 150 may determine whether at least 35 feature points from the extracted 40 feature points match the feature points extracted during the user registration.

When it is determined that the feature points extracted from the image in which the portion of the face is covered match the feature points extracted during the user registration, the controller 150 may determine the passenger as the user. That is, because the controller 150 determines that the current boarding condition of the passenger satisfies the boarding condition of the user, the controller 150 may easily recognize the face and determine whether the face is the face of the user even when a smaller number of feature points are extracted from the image in which the portion of the face is covered.

When it is determined that the passenger is the user, the controller 150 may set in-vehicle setting information as information of the user. In this connection, the in-vehicle setting information may include a location of a steering wheel, a position of the seat, an air conditioning setting temperature, a side mirror setting location, a radio reception frequency, navigation setting information, and the like.

According to an embodiment of the present disclosure, even when the passenger is determined as the user, the controller 150 may continuously learn the boarding information of the user during traveling of the vehicle (after start of the vehicle is activated and until the start of the vehicle is deactivated), and the learning may be performed using the RNN.

Figure 6:
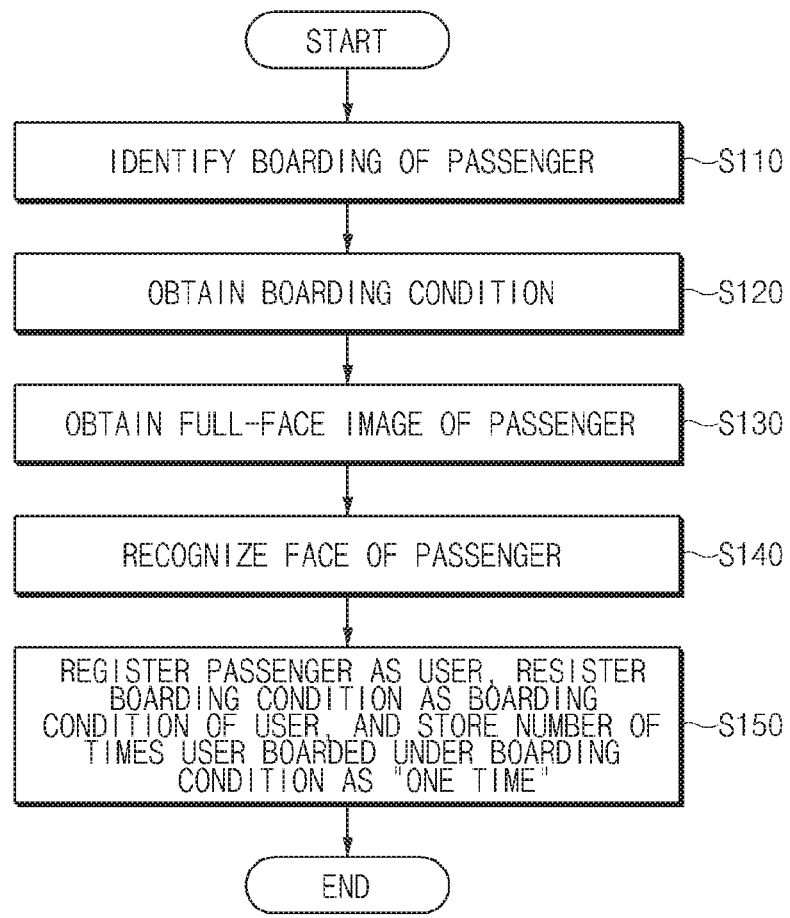
FIG. 6 is a diagram illustrating a method for registering a passenger as a user according to one embodiment of the present disclosure.

FIG. 6 is a diagram illustrating a method for registering a passenger as a user according to one embodiment of the present disclosure.

As shown in FIG. 6, the controller 150 obtains the information detected from the sensor 120 to identify the boarding of the passenger (S110). In addition, the boarding condition is obtained from the navigation device 130 (S120). In this connection, the boarding condition may include the boarding location and time (date (day)) of the passenger. The controller 150 obtains the full-face image of the passenger from the camera 110 (S130). In S130, the controller 150 may extract the feature points from the obtained full-face image of the passenger.

The controller 150 recognizes the face of the passenger using the extracted feature points (S140). In S140, when recognizing the face of the passenger based on the feature points extracted from the full-face image, the controller 150 may determine that the face is recognized in the normal state. In this case, the controller 150 may register the passenger as the user. When the passenger is registered as the user, the controller 150 registers the boarding condition obtained when the passenger boards the vehicle as the boarding condition of the user (S150). In S150, when the user registration and the boarding condition registration are completed, the controller 150 may control the storage device 140 to store the user registration information and the user boarding condition. In addition, in S150, when the user registration and the boarding condition registration are completed, the controller 150 may control to store the number of times the user has boarded under the boarding condition of the user as "one time".

Figure 7:
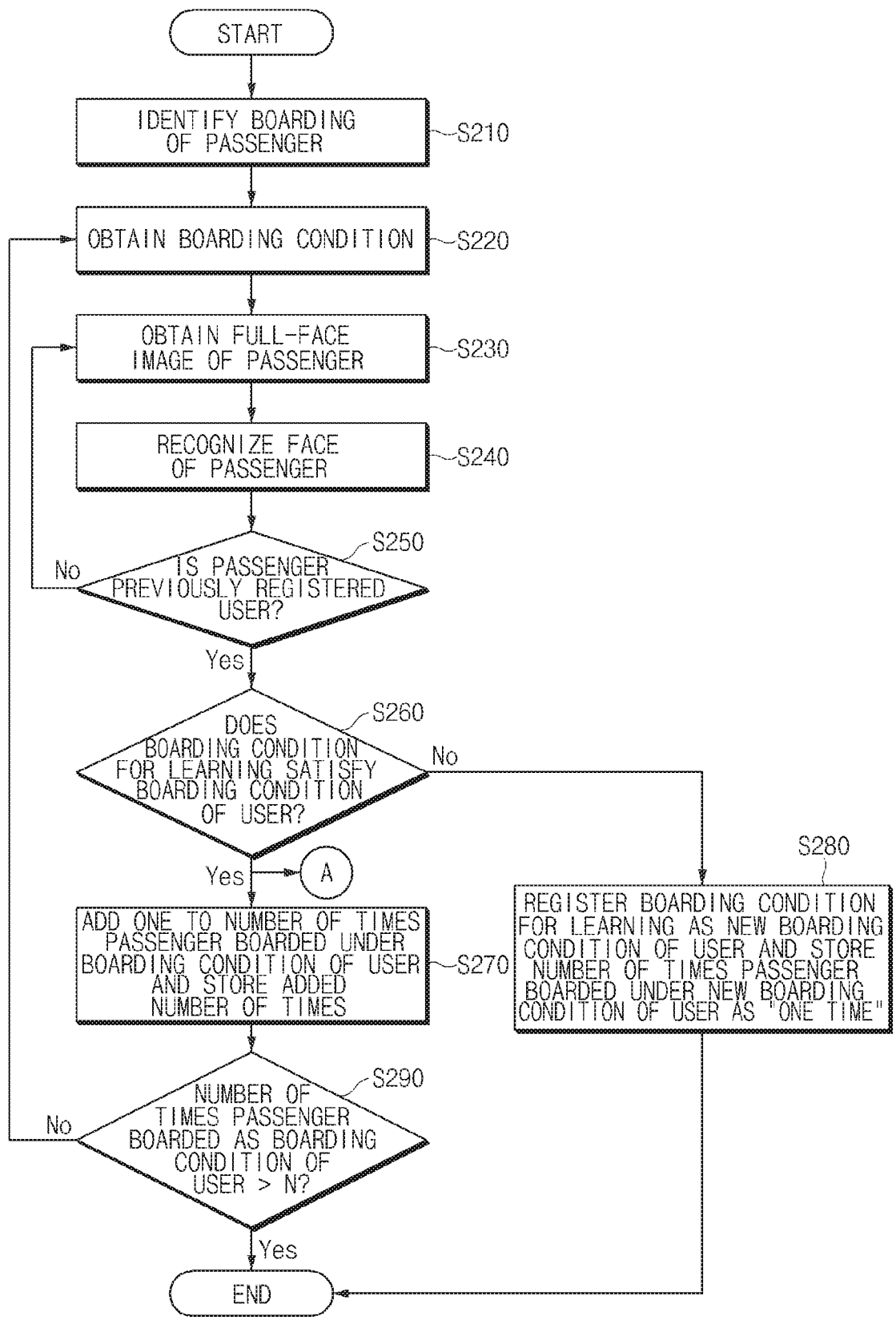
FIG. 7 is a diagram illustrating a method for learning a boarding condition according to one embodiment of the present disclosure.

FIG. 7 is a diagram illustrating a method for learning a boarding condition according to one embodiment of the present disclosure.

As shown in FIG. 7, the controller 150 identifies the vehicle boarding of the passenger based on the information obtained from the sensor 120 (S210). In addition, the controller 150 obtains the boarding condition for learning (S220). In S220, the controller 150 may obtain the boarding time and the boarding location of the passenger for learning the learning condition of the passenger. Therefore, the boarding condition for learning may also be referred to as the boarding time for learning and the boarding location for learning.

When the controller 150 obtains the boarding condition for learning, the controller 150 obtains the full-face image of the passenger (S230). In S230, the controller 150 may extract the feature points from the obtained full-face image of the passenger.

The controller 150 recognizes the face of the passenger using the extracted feature points (S240). Then, the controller 150 determines whether the passenger is the previously registered user based on the recognized face of the user (S250). When it is determined in S250 that the passenger is the previously registered user (Yes), the controller 150 determines whether the boarding condition for learning satisfies the boarding condition of the user (S260). In one example, in S250, the controller 150 may control to perform S230 when the passenger is not the previously registered user (No).

In S260, the controller 150 may determine how much the boarding location for learning and the boarding time for learning are similar to the boarding location and the boarding time of the user, and determine whether the boarding condition for learning satisfies the boarding condition of the user based on the determination result. A more detailed operation of S260 will be described with reference to FIG. 8.

When it is determined in S260 that the boarding condition for learning satisfies the boarding condition of the user (Yes), the controller 150 may control the passenger to add one to the number of times the passenger boarded under the boarding condition of the user and store the added number of times (S270). On the other hand, when it is determined in S260 that the boarding condition for learning does not satisfy the boarding condition of the user (No), the controller 150 may control to register the boarding condition for learning as a new boarding condition of the user and store the number of times the passenger boarded under the new boarding condition of the user as "one time" (S280).

The controller 150 determines whether the number of times the passenger has boarded under the boarding condition of the user exceeds the predetermined number N (e.g., 10) (S290). When it is determined in S290 that the number of times the passenger has boarded under the boarding condition of the user exceeds the predetermined number (Yes), the controller 150 may determine that the learning is completed as the boarding condition of the user. On the other hand, when it is determined in S290 that the number of times the passenger has boarded under the boarding condition of the user does not exceed the predetermined number N, the controller 150 may control to perform S220. According to an embodiment, the operations from S220 to S280 may be performed using the recurrent neural network (RNN).

Figure 8:
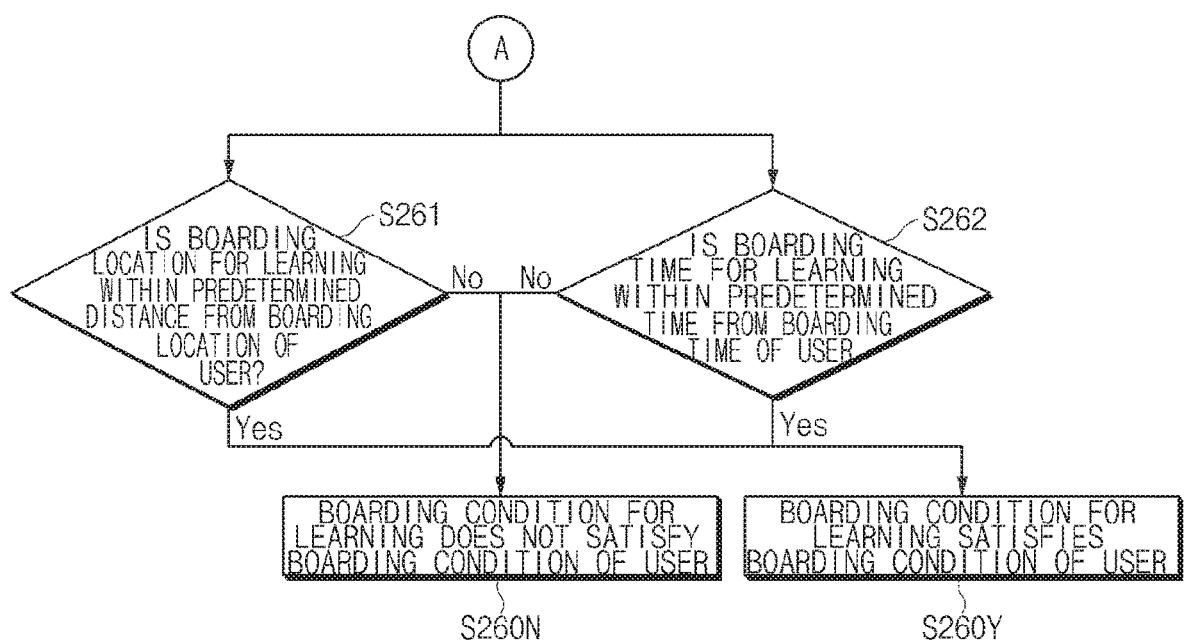
FIG. 8 is a flowchart illustrating a method for determining whether a user boarding condition is satisfied according to one embodiment of the present disclosure.

FIG. 8 is a flowchart illustrating a method for determining whether a user boarding condition is satisfied according to one embodiment of the present disclosure.

The controller 150 determines whether the boarding location for learning is within the predetermined distance from the boarding location of the user (S261). In this connection, the predetermined distance may be the radius of 500 meters. When it is determined in S261 that the boarding location for learning is within the predetermined distance from the boarding location of the user (Yes), the controller 150 may determine that the boarding condition for learning satisfies the boarding condition of the user (S260Y). On the other hand, when it is determined in S261 that the boarding location for learning is not within the predetermined distance from the boarding location of the user (No), the controller 150 determines that the boarding condition for learning does not satisfy the boarding condition of the user (S260N).

In addition, the controller 150 determines whether the boarding time for learning is within the predetermined time from the boarding time of the user (S262). In this connection, the predetermined time may be 60 minutes. When it is determined in S262 that the boarding time for learning is within the predetermined time from the boarding time of the user (Yes), the controller 150 may determine that the boarding condition for learning satisfies the boarding condition of the user (S260Y). On the other hand, when it is determined in S262 that the boarding time for learning is not within the predetermined time from the boarding time of the user (No), the controller 150 determines that the boarding condition for learning does not satisfy the boarding condition of the user (S260N).

Figure 9:
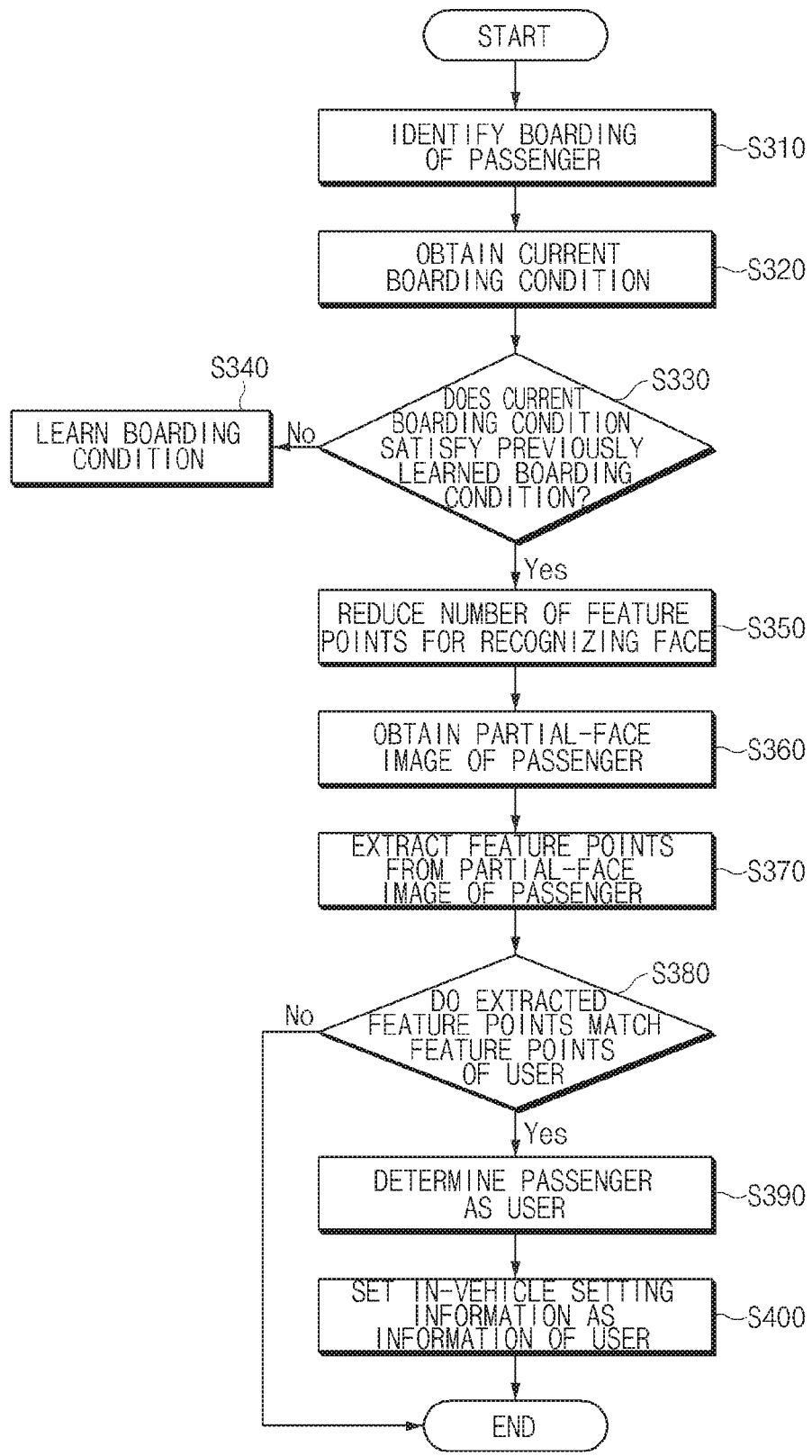
FIG. 9 is a flowchart illustrating a method for recognizing a face according to one embodiment of the present disclosure.

FIG. 9 is a flowchart illustrating a method for recognizing a face according to one embodiment of the present disclosure.

As shown in FIG. 9, the controller 150 identifies the vehicle boarding of the passenger based on the information obtained from the sensor 120 (S310). In addition, the controller 150 obtains the current boarding condition from the navigation device 130. In this connection, the current boarding condition may include the current boarding time and the current boarding location of the passenger.

The controller 150 determines whether the obtained current boarding condition satisfies a previously learned boarding condition (S330). In S330, the controller 150 may determine whether the current boarding location and boarding time satisfy a previously learned boarding condition of the user. In this connection, the controller 150 may determine whether the current boarding location of the passenger is within the predetermined distance from the boarding location of the user, and may determine whether the current boarding time of the passenger is within the predetermined time from the boarding time of the user.

When it is determined in S330 that the current boarding condition does not satisfy the previously learned boarding condition (No), the controller 150 allows the current boarding condition to be learned (S340). On the other hand, when it is determined in S330 that the current boarding condition satisfies the previously learned boarding condition (Yes), the controller 150 reduces the number of feature points for recognizing the face of the passenger (S350).

In S350, although the controller 150 extracts sufficient feature points to recognize the face based on the full-face image in the user registration operation and the boarding condition learning operation, the controller 150 may reduce and reset the number of feature points when it is determined that the current boarding condition satisfies the previously learned boarding condition.

For example, when the number of feature points extracted to recognize the face in the full-face image is 70, the controller 150 may determine that at least 70 feature points are required to recognize the face. However, when it is determined that the current boarding condition satisfies the previously learned condition according to an embodiment of the present disclosure, the controller 150 may reduce and reset the number of feature points for recognizing the face to 35.

The controller 150 obtains the partial-face image of the passenger (S360). In this connection, the partial-face image may refer to the image in which a portion of the face is covered, not the full-face image (see, e.g., FIGS. 3 and 4).

The controller 150 extracts the feature points based on the image in which the portion of the face is covered (S370). A detailed description was provided with reference to FIG. 5.

The controller 150 determines whether the feature points extracted from the image in which the portion of the face is covered match the feature points extracted during the user registration (S380). In S380, the controller 150 may determine whether the feature points extracted from the image in which the portion of the face is covered match the extracted feature points during the user registration by the reduced number of feature points. For example, when the controller 150 extracts 40 feature points from the image in which the portion of the face is covered and the reduced number of feature points is 35, the controller 150 may determine whether at least 35 feature points from the extracted 40 feature points match the feature points extracted during the user registration.

When it is determined in S380 that the feature points extracted from the image in which the portion of the face is covered match the feature points extracted during the user registration (Yes), the controller 150 may determine the passenger as the user (S390). That is, because the controller 150 determines that the current boarding condition of the passenger satisfies the learned boarding condition of the user, the controller 150 may easily recognize the face and determine whether the face is the face of the user even when a smaller number of feature points are extracted from the image in which the portion of the face is covered.

When it is determined that the passenger is the user, the controller 150 may set the in-vehicle setting information as the information of the user (S400). In this connection, the in-vehicle setting information may include the location of the steering wheel, the position of the seat, the air conditioning setting temperature, the side mirror setting position, the radio reception frequency, the navigation setting information, and the like.

According to an embodiment of the present disclosure, even when the passenger 150 is determined as the user, the controller 150 may continuously learn the boarding information of the user during the traveling of the vehicle (after the start of the vehicle is activated and until the start of the vehicle is deactivated), and the learning may be performed using the RNN.

Figure 10:
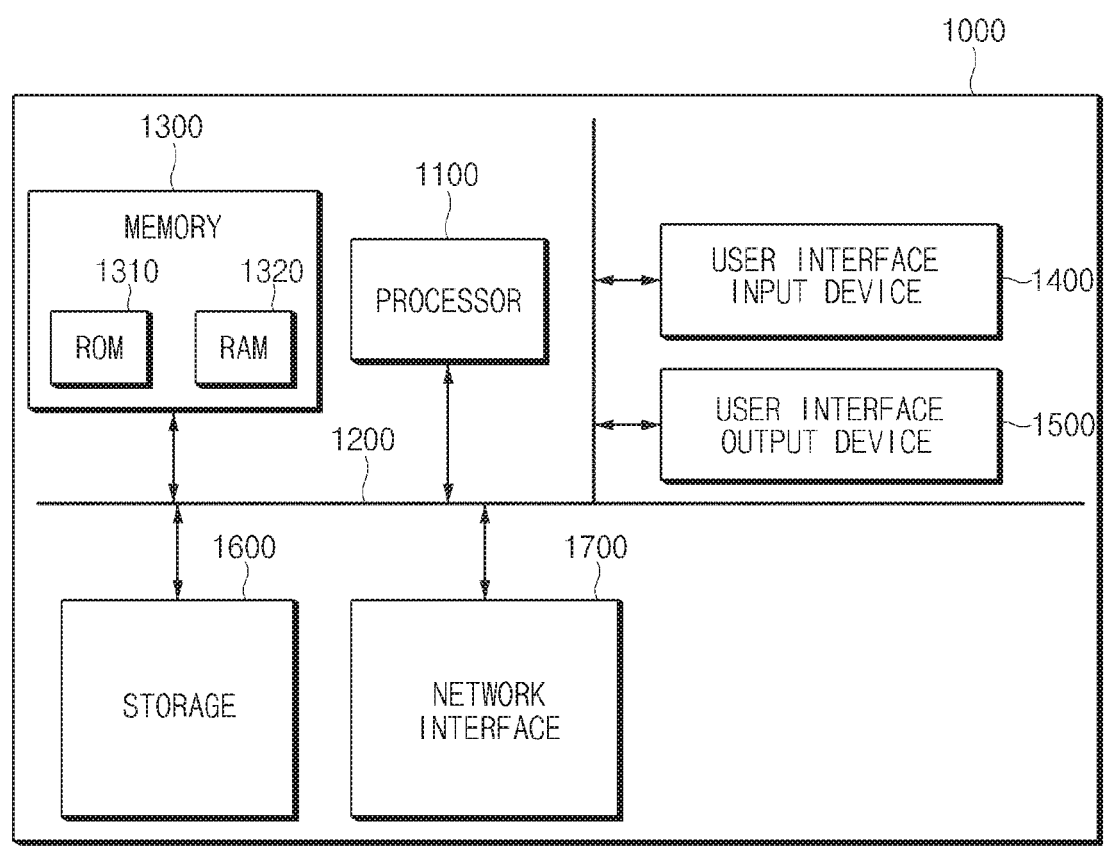
FIG. 10 illustrates a computing system in which a method according to one embodiment of the present disclosure is implemented.

FIG. 10 illustrates a computing system in which a method according to an embodiment of the present disclosure is implemented.

Referring to FIG. 10, a computing system 1000 may include at least one processor 1100, a memory 1300, a user interface input device 1400, a user interface output device 1500, storage device 1600, and a network interface 1700, which are connected with each other via a bus 1200.

The processor 1100 may be a central processing unit (CPU) or a semiconductor device that processes instructions stored in the memory 1300 and/or the storage device 1600. The memory 1300 and the storage device 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage device 1600) such as a RAM, a flash memory, a ROM, an EPROM, an EEPROM, a register, a hard disk, a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure are not limited by the embodiments. The scope of the present disclosure should be construed on the basis of the accompanying claims, and all the technical ideas within the scope equivalent to the claims should be included in the scope of the present disclosure.

The apparatus and the method for recognizing a face according to an embodiment of the present disclosure may recognize a user accurately by improving a face recognition rate even when a portion of the face of the passenger is covered.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus comprising:
   a camera configured to obtain a partial-face image of a passenger; and
   a controller configured to:
      learn a boarding condition of a user;
      reduce a number of feature points for recognizing a face when a current boarding condition of the passenger satisfies the learned boarding condition of the user; and
      determine the passenger as the user when feature points extracted from the partial-face image of the passenger match the reduced feature points,
   wherein the partial-face image includes an image in which a portion of the face is not visible so that the partial-face image is not a full-face image, and
   wherein the apparatus is configured to recognize the face.

2. The apparatus of claim 1, wherein the boarding condition includes information on a boarding position and a boarding time.

3. The apparatus of claim 1, wherein the controller is configured to:

obtain a boarding condition and a first full-face image of a first passenger;

extract feature points from the first full-face image and register the first passenger as the user;

register the boarding condition of the first passenger as the boarding condition of the user; and store a number of times the user has boarded under the boarding condition of the user as one time.

4. The apparatus of claim 1, wherein the controller is configured to:

obtain a boarding condition for learning and a second full-face image of a second passenger; and extract feature points from the second full-face image to determine whether the second passenger is the user.

5. The apparatus of claim 4, wherein the controller is configured to determine whether the boarding condition for learning satisfies the boarding condition of the user when the second passenger is the user.

6. The apparatus of claim 4, wherein the controller is configured to determine that the boarding condition for learning satisfies the boarding condition of the user when a boarding location for learning is within a predetermined distance from a boarding location of the user, or when a boarding time for learning is within a predetermined time from a boarding time of the user.

7. The apparatus of claim 4, wherein the controller is configured to add one to a number of times the user has boarded under the boarding condition of the user when the boarding condition for learning satisfies the boarding condition of the user.

8. The apparatus of claim 4, wherein the controller is configured to:

register the boarding condition for learning as a new boarding condition of the user when the boarding condition for learning does not satisfy the boarding condition of the user; and store a number of times the user has boarded under the new boarding condition as one time.

9. The apparatus of claim 1, wherein the controller is configured to determine that learning of the boarding condition of the user is completed when a number of times the user has boarded under the boarding condition of the user exceeds a predetermined number.

10. A method for recognizing a face of a user, the method comprising:

obtaining, by a camera, a partial-face image of a passenger;

reducing, by a controller, a number of feature points for recognizing the face when a current boarding condition of the passenger satisfies a learned boarding condition of the user; and determining, by the controller, the passenger as the user when feature points extracted from the partial-face image of the passenger match the reduced feature points, wherein the partial-face image includes an image in which a portion of the face is not visible so that the partial-face image is not a full-face image.

11. The method of claim 10, wherein the current boarding condition includes information on a boarding location or a boarding time.

12. The method of claim 10, wherein the learned boarding condition of the user is developed by:

obtaining a boarding condition and a first full-face image of a first passenger;

extracting a plurality of first feature points from the first full-face image and registering the first passenger as the user; and registering the boarding condition of the first passenger as the boarding condition of the user and storing a number of times the user has boarded under the boarding condition of the user as one time.

13. The method of claim 10, wherein the learned boarding condition of the user is developed by:

obtaining a boarding condition for learning and a second full-face image for learning of a second passenger;

extracting feature points from the second full-face image for learning to determine whether the second passenger is the user;

determining whether the boarding condition for learning satisfies a boarding condition of the user when the second passenger is the user;

adding one to a number of times the user has boarded under the boarding condition of the user when the boarding condition for learning satisfies the boarding condition of the user;

determining whether the number of times the user has boarded under the boarding condition of the user exceeds a predetermined number; and determining that developing the learned boarding condition of the user is completed when the number of times the user has boarded under the boarding condition of the user exceeds the predetermined number.

14. The method of claim 13, wherein determining whether the boarding condition for learning satisfies the boarding condition of the user includes determining that the boarding condition for learning satisfies the boarding condition of the user when a boarding location for learning is within a predetermined distance from a boarding location of the user, or when a boarding time for learning is within a predetermined time from a boarding time of the user.

15. The method of claim 13, further comprising:

registering the boarding condition for learning as a new boarding condition of the user when the boarding condition for learning does not satisfy the boarding condition of the user; and storing the number of times the user has boarded under the new boarding condition as one time.

16. A method for recognizing a face, the method comprising:

obtaining a facial image of a passenger who has boarded a vehicle, wherein the facial image is a partial facial image, and wherein the partial facial image includes an image in which a portion of the face is not visible so that the partial facial image is not a full-face image;

obtaining current boarding condition information of the passenger;

comparing the facial image of the passenger to a facial image of a registered user;

comparing the current boarding condition information of the passenger to a learned boarding condition of the registered user;

reducing a number of feature points for recognizing the face when the current boarding condition information of the passenger satisfies a learned boarding condition of the registered user; and determining the passenger as the registered user when feature points extracted from the partial face image of the passenger match the reduced feature points.

* * * * *